United States Patent Office 2,762,712
Patented Sept. 11, 1956

2,762,712

PRINTING INK VEHICLE CONTAINING ESTER-HYDROCARBON COPOLYMER DRYING OIL

Herman S. Bloch, Chicago, and Alfred E. Hoffman, Clarendon Hills, Ill., assignors to Universal Oil Products Company, Des Plaines, Ill., a corporation of Delaware No Drawing. Application June 1, 1953,
Serial No. 358,954

12 Claims. (Cl. 106—28)

This application is a continuation-in-part of our copending application Serial No. 132,424, filed December 10, 1949, now Patent No. 2,640,782, June 2, 1953.

This invention relates to printing inks and particularly to inks of the oxidizing type containing a varnish vehicle which dries upon exposure to atmospheric oxygen to form a hard film especially adapted for use in typographic, lithographic and intaglio printing processes. More specifically, the invention concerns a printing ink of the oxidizing type in which the drying oil component is a synthetic hydrocarbon-unsaturated fatty acid ester copolymer drying oil, hereinafter referred to, said printing ink composition being capable of drying rapidly upon exposure to atmospheric oxygen to form a tack-free, hard, but flexible printed film.

Printing inks of the oxidizing type consist essentially of a vehicle or varnish which is usually a solution or a copolymerized mixture of a resin and a drying oil and one or more pigments suspended in the vehicle. The vehicle may also contain other components such as fatty acids, a wax, and sometimes a volatile solvent such as a petroleum naphtha, particularly if the drying oil component and/or the drying oil-resin mixture is viscous and requires a fluid diluent to reduce the viscosity of the varnish and enhance its flow characteristics when subsequently composited into a printing ink.

One of the most important properties of the drying oil component used in a printing ink is its ability to oxidize rapidly to a solid non-tacky film. If an ink does not dry well, its use is limited to very adsorbent papers such as machine finish papers. In order to be used on coated and supercalendered papers it must dry rapidly so that it will not smear or rub off when adjacent sheets of paper are bound or when the paper is folded or creased. One of the primary objects of this invention is to provide a printing ink formulation which dries rapidly and has the property of drying to an ink film of greater scratch and rub resistance. Other advantages are also obtained through the use of the present hydrocarbon-ester drying oils in printing ink compositions, as will be hereinafter noted.

The unsaturated hydrocarbon component of the present copolymer drying oil, having the composition herein specified and possessing a markedly higher viscosity than the usual glyceride drying oils permits economies in the bodying procedure necessary to attain the usual 8–14 poise drying oil required for the preparation of printing ink vehicles. For example, linseed oil may be bodied from its naturally fluid state to the required 8–14 poise material by heating the same at a temperature of about 300° C. for several hours. Reaction temperatures below about 300° C. measurably reduce the bodying rate and increase the bodying time to impractically long periods, while bodying temperatures appreciably above about 300° C. cause considerable decomposition of the oil. The present copolymer drying oil, the copolymerization product of a particular type of unsaturated hydrocarbon oil with an unsaturated fatty acid ester such as linseed oil may be bodied at 300° C. in a matter of minutes or at a much lower temperature (e. g. 170° C.) within a few hours.

The printing ink composition provided in the present invention, comprising a particular hydrocarbon-fatty acid ester copolymer drying oil as the principal component of the varnish vehicle, possesses a high degree of wafer tolerance which becomes an important and desirable characteristic in the ability of the ink to resist high pressroom humidity. This factor may be further enhanced by incorporating a petroleum wax or beeswax into the composition in amounts of from about 0.5 to about 5% by weight of the ink composition.

Other objects of this invention include providing a superior printing ink composition of the type which dries by exposure to atmospheric oxygen, particularly for lithographic, typographic and intaglio printing processes, the improvements thereof comprising greater fluidity or flow characteristics, greater drying speed, greater rub and scratch resistance, and greater penetrability into the article being printed.

In one of its embodiments the present invention relates to a printing ink composition comprising a vehicle and a pigment as major components thereof, said vehicle comprising the drying oil product formed by cobodying an unsaturated fatty acid glyceride drying oil with a hydrocarbon drying oil consisting of liquid, polyolefinic, high molecular weight aliphatic hydrocarbons, being the hydrogen fluoride catalyzed polymers of an aliphatic isomono-olefin containing not more than about eight carbon atoms per molecule with an aliphatic conjugated diolefin containing not more than about eight carbon atoms per molecule.

A more specific embodiment of the invention relates to a printing ink composition containing from about 20 to about 75 parts by weight of a varnish vehicle having a viscosity of from about 8 to about 14 poises at 20° C., consisting of a copolymerized mixture of from about 10 to about 75 parts by weight of an unsaturated fatty acid ester drying oil and from about 25 parts by weight of an aliphatic, polyolefinic hydrocarbon drying oil having a molecular weight of from about 500 to about 5000, containing from about 10 to about 80 double bonds per molecule and formed by the hydrogen fluoride catalyzed copolymerization of an isomono-olefin and a conjugated diolefin at temperatures of from about —80° C. to about 0° C., said printing ink composition also containing from about 0.1 to about 1% by weight of a metallic drier salt and from about 10% to about 40% by weight of a pigment.

Other embodiments of the invention relating to specific methods of compositing the printing ink ingredients, specific components of the ink and to other alternative procedures in the preparation of the varnish vehicle, etc., will be referred to in greater detail in the following further description of the invention.

One of the essential initial drying oil reactants involved in the preparation of the present copolymer drying oil component of the printing ink composition herein provided which distinguishes the product from conventional oxidative drying inks containing only unsaturated fatty acid ester drying oils, known presently to the art, and which lends its distinct properties to the ink to provide a product having the distinguishing and advantageous properties hereinabove noted is a drying oil consisting essentially of a mixture of relatively high molecular weight hydrocarbons, the molecular weight of which are from about 500 to about 5000 and which contain in their molecular structure multiple olefinic double bonds, the number of double bonds contained in the hydrocarbons generally being from about 10 to about 80 per molecule depending upon the molecular weight and method of preparation. These hydrocarbon drying oils, essentially a mixture of unsaturated hydrocarbons, are capable of drying rapidly by exposure to atmospheric oxygen to form tough, hard, resinous films having high rub and scratch resistance and high resistance to atmospheric humidity. This mixture of hydrocarbons, referred to herein as an unsaturated hydrocarbon drying oil, when copolymerized or cobodied with an unsaturated fatty acid ester type of drying oil, provides the varnish vehicle utilized in the preparation of the present printing ink composition.

Copolymer hydrocarbon oils capable of drying upon exposure to atmospheric oxygen to form tough, resinous, hard films are prepared by copolymerizing a conjugated diolefinic hydrocarbon containing not more than about eight carbon atoms per molecule with a monoiso-olefin, also containing not more than about eight carbon atoms per molecule at a temperature of from about −80° C. to about 0° C., utilizing anhydrous hydrogen fluoride as the polymerization catalyst and charging a quantity of diolefin to the process representing from about 60 to about 95% by weight of the combined di- and monoiso-olefin reactants. It is found that at these specific conditions, that is, at the specified temperatures and utilizing the particular ratio of di- and mono-olefin reactants as well as the particular specified catalyst, a liquid copolymer product, believed to be an open-chain or aliphatic type hydrocarbon, is obtained which has drying oil properties, rather than a solid resinous or plastic product representing a cross-polymer of the reactant monomers, normally obtained upon copolymerization of the indicated reactants at higher temperatures, in the presence of other catalysts, and utilizing other reacting ratios of the monomers than hereinabove specified for production of the present liquid product having drying oil properties. The conjugated diolefin reactant utilized in the preparation of the unsaturated hydrocarbon drying oil reactant specified is a diolefin which preferably contains a terminal methylene group, typical examples of which are such hydrocarbons as piperylene, butadiene-1,3, isoprene, hexadiene-1,3, 2-methylpentadiene-1,3, and others of homologous and analogous structure. Typical monoiso-olefinic hydrocarbon reactants utilizable in the preparation of the unsaturated hydrocarbon drying oil reactant of this invention also desirably contain a terminal methylene group and contain not more than about eight carbon atoms per molecule, including such typical members of this group as 2-methylbutene-1,3-methylbutene-1, 2-ethylpentene-1, 2-methylhexene-1 and isomers as well as homologues thereof, the preferred monoiso-olefin being isobutylene (2-methylpropene).

In the preparation of the unsaturated hydrocarbon drying oil reactant the diolefin and monoiso-olefin reactants are condensed or polymerized in the presence of a catalyst consisting of substantially anhydrous (that is, containing less than about 10% by weight of water) hydrogen fluoride at temperatures of from about −80° to about 0° C., yielding the desired liquid hydrocarbon copolymers having drying oil properties. The liquid hydrogen fluoride is preferably introduced into the reaction mixture of diolefin and monoiso-olefin as a mist or in the form of a vapor diluted with an inert gas such as nitrogen, propane, butane etc., the monoiso-olefin and diolefin reactants being preferably dissolved in a volatile, inert solvent such as propane, Freon, butane, etc. The introduction of the catalyst into the mixture of reactant monomers is desirably accompanied by rapid stirring of the reaction mixture to distribute the catalyst as rapidly and as uniformly as possible throughout the reaction mixture while it is added to the mixture. The reactants are desirably diluted with an inert compound, preferably a volatile solvent, such as propane, not only for the purpose of controlling the rate of reaction by dilution of the reactants but also for the purpose of maintaining the reaction temperature within the desired range by evaporative cooling of the volatile diluent as the temperature of the mixture tends to exceed the boiling point of the diluent. This precaution eliminates local high temperature zones within the reaction mixture caused by the highly exothermic copolymerization of the mono- and diolefinic reactants, which, if not eliminated, would tend toward the formation of the high molecular weight, solid cross-polymers of the olefinic hydrocarbon reactants. The presence of a diluent in the reaction mixture moderates the rate of reaction by virtue of its dispersing effect on the highly reactive mono- and diolefin charge stocks, thus tending to reduce uncontrolled or too rapid a rate of polymerization.

The reaction mixture, following a suitable reaction period, usually from about ½ to about 6 hours in duration, may be quenched at the low temperature maintained during the copolymerization reaction with a solvent for the hydrogen fluoride catalyst or a compound which reacts therewith to reduce its catalytic activity. Substances which thus act in the capacity of quenching agents of the hydrogen fluoride catalyst are collectively referred to as "bases" and may comprise neutralizing agents, diluting agents, or compounds which selectively react with the hydrogen fluoride to form a complex therewith. Compounds which remove the hydrogen fluoride from the reaction mixture but do not form a product from which the hydrogen fluoride may be readily separated for recycling purposes are such reagents as water, aqueous solutions of sodium hydroxide, potassium hydroxide, ammonia etc. These react or dissolve the catalyst in the added base to form an aqueous phase containing the hydrogen fluoride component of the reaction mixture, the aqueous phase thereafter being separated from the liquid hydrocarbon product, for example, by decantation. While such reagents are often convenient and produce a satisfactory hydrocarbon product, the catalyst is not recovered in a condition for re-use, except in the case of aqueous hydrogen fluoride from which the anhydrous acid may be distilled in part. Other methods of catalyst removal which circumvent this difficulty involve adding a so-called "quenching" agent to the reaction mixture which is capable of forming a heat-decomposable salt or complex with the hydrogen fluoride. The complex may be subsequently separated from the "quenched" reaction product and treated to recover the hydrogen fluoride therefrom. Certain oxygen-containing organic compounds such as alcohols, esters, ethers, phenols, etc. combine with hydrogen fluoride to form the above-indicated complexes and free the drying oil copolymer product. Certain inorganic salts, such as sodium, potassium and lithium fluorides as well as others combine with the hydrogen fluoride to form double salts therewith which likewise are heat-decomposable and which may be heated to recover the hydrogen fluoride in an anhydrous condition, suitable for recycling. The amines and particularly the high boiling amines, such as aniline, pyridine, quinoline, and others form hydrogen fluoride salts which may be heated to recover not only the organic amine for recycle purposes, but the hydrogen fluoride as well in an anhydrous state for recycling to the polymerization stage of the process. Following the addition of a base or a quenching agent to the polymerization reaction mixture the copolymer product may be separated therefrom by any of several alternative procedures. One of the preferred procedures comprises adding a volatile naphtha diluent or other mixture of hydrocarbons containing a large percentage of aromatic hydrocarbons such as benzene, toluene, xylene, etc. to the reaction mixture and separating the resultant phases, the copolymer product dissolving in the added solvent. The hydrocarbon phase is thereafter decanted from the remaining reaction mixture and the copolymer product recovered from the separated phase, for example, by distillation.

The copolymer product drying oil is a light-colored viscous mixture of highly unsaturated hydrocarbons containing from about 10 to about 80 non-conjugated olefinic double bonds per molecule and comprises a mixture of aliphatic hydrocarbons having molecular weights above about 500 up to about 5000. The oil dries rapidly, especially in the presence of metallic driers, such as cobalt naphthenate, cobalt oleate and other well-known drier salts, particularly those of lead and manganese, upon exposure in thin films to atmospheric oxygen. A film of the copolymer oil when subjected to oxidative drying becomes tack-free in less than about eight hours and dries to a completely non-tacky film in less than about 24 hours to form a coating of extreme hardness (having Sward hardness values up to about 50) which are also tough, highly resistant to abrasion, do not discolor upon exposure to ultra-violet radiation, and are moisture and alkali resistant. The polymer hydrocarbons comprising the product of the polymerization of a mixture of monoisoolefin and a conjugated diolefin at the above reaction conditions are believed to be of relatively straight openchain structure having double bonds and methyl substituents distributed throughout the length of the copolymer molecules in isolated positions. This structure is believed to account for its remarkable film-forming properties and its capacity to dry at high speed upon exposure to atmospheric oxygen.

The unsaturated fatty acid ester drying oils utilized in the preparation of the drying oil vehicle of the present printing ink composition by cobodying or copolymerizing the same with the unsaturated hydrocarbon drying oil are those which occur either naturally as fatty acid glycerides or as synthetically produced unsaturated fatty esters of other alcohols than glycerol. Such modified esters may be represented, for example, by the fatty acid esters of methanol, ethanol, and homologous alcohols; the glycols or polymeric glycols, such as a member of the polyethylene glycol series; other polyhydric alcohols, such as pentaerythritol, polyallyl alcohol, and 2,2-dimethylpropanol, or of an unsaturated alcohol, such as allyl alcohol or butenol. Included in the unsaturated fatty acid ester drying oils contemplated herein are the drying and semi-drying classes. Of these, particularly tung oil, linseed oil, dehydrated castor oil, oiticica oil, perilla oil, soybean oil, hempseed oil, poppyseed oil, safflower oil, walnut oil, sardine oil etc., are representative oils of the glyceride ester type utilizable herein. Other glyceride oils which are considered to be non-drying, such as olive oil, cottonseed oil and coconut oil, may be utilized in the drying oil composition as plasticizers. It is also contemplated herein to utilize the fatty acids themselves derived from the esters, such as the glycerides, for example, and recovered from such esters by hydrolysis. The quantity of fatty acids in the printing ink composition is, however, preferably maintained at below about 10% by weight to minimize the problem of "livering" in which the vehicle tends to separate from the pigments and other solids in the composition when the proportion of fatty acids therein becomes excessive and when reactive pigments are present.

The respective unsaturated fatty acid ester drying oil and unsaturated hydrocarbon drying oil components of the present drying oil vehicle composition are copolymerized in the proportion of from about 10 to about 90 parts by weight of the unsaturated hydrocarbon oil to from about 10 to about 90 parts by weight of the unsaturated fatty acid ester drying oil, and preferably in the proportion of from about 90 to about 25 parts by weight of the hydrocarbon oil per 100 parts by weight of the mixture. In the production of the present thermally cobodied or copolymerized drying oil vehicle, a mixture of the specified unsaturated hydrocarbons and fatty acid ester drying oils is stirred while the mixture is heated for a time sufficient to increase the viscosity of the mixture to the desired value, generally to a viscosity of from about 8 to about 14 poises. The relative proportions of the respective drying oils is preferably maintained within the above specified range during the cobodying reaction. Depending upon the viscosity obtained and ultimately desired of the final printing ink composition, additional quantities of the unsaturated hydrocarbon drying oil may be added to the cobodied mixture to increase the viscosity of the mixture to the desired value or additional quantities of the fatty ester oil may be added to reduce the viscosity.

The cobodying or copolymerization of the unsaturated hydrocarbon and fatty acid ester drying oils to form the present printing ink drying oil vehicles may also be effected in the presence of certain types of catalysts, generally characterized as acid-acting catalysts, such as phosphoric acid, a calcined composite of silica and alumina, a "solid phosphoric acid" catalyst, formed by calcining a composite of a siliceous adsorbent such as kieselguhr with a suitable phosphoric acid, such as ortho-phosphoric acid, a Friedel-Crafts halide catalyst, including boron trifluoride, zinc chloride, ferric chloride, tin chloride, the corresponding metallic bromides and particularly the modified Friedel-Crafts catalysts referred to in the art as "ansolvo" acids, formed by reacting Friedel-Crafts halide with an oxygen-containing organic compound, such as an alcohol, an ether, a ketone, a phenol, an aldehyde, a carboxylic acid, etc., whereby a complex between the oxygen-containing organic compound and the Friedel-Crafts halide is formed. Typical of the latter preferred complex type catalysts are such combinations as a boron trifluoride diethyl etherate, an aluminum chloride ethyl alcoholate, an aluminum bromide diacetonate etc. The catalyst is utilized in the mixture of unsaturated fatty acid ester and unsaturated hydrocarbon drying oils to form the catalytic copolymers thereof in amounts of from about 0.5 to about 10% by weight of the mixture of oils, the catalyst being added gradually to the reaction mixture as the latter is stirred to thoroughly distribute the catalyst in the mixture of drying oil reactants. In order to moderate the copolymerization and reduce discoloration of the product as a result of local overheating in the highly exothermic polymerization reaction, the reactants are preferably dissolved in a volatile solvent prior to introduction of the catalyst into the reaction. Utilizable solvents for the reactants may be selected from the hydrocarbons, alcohols, ethers, esters and other nonreactive organic compounds, including such typical examples as propane, n-butane, pentane, n-hexane, cyclohexane, benzene, ethyl alcohol, diethyl ether, etc. The reaction mixture may be maintained in substantially liquid phase during the reaction by imposing sufficient pressure on the mixture of drying oils at the reaction temperature, to liquefy the most volatile components. Suitable temperatures for the catalytic copolymerization of the unsaturated hydrocarbon and fatty acid ester drying oil is from about $-20°$ to about $100°$ C., preferably from about $10°$ to about $50°$ C.

The printing ink vehicle may contain a resin to provide a true varnish vehicle which adds substance or body, hardness, gloss, and permanency to the film of print obtained in the printing operation utilizing the present printing ink composition. In the use of certain types of resins, having the properties of elasticity and/or toughness, a printed film is obtained in which these properties are also transferred to the ultimately dried ink composition film, thus providing a film which may be flexed without checking or cracking, particularly in the case of relatively thick or heavy film prints obtained, for example, by the intaglio printing process or obtained when smooth-surfaced, hard and non-adsorbent surfaces are printed with the printing ink composition. Suitable resins for incorporation into the varnish vehicle include such typical classes as the natural resins, for example, rosin, copal, kauri, dammar, elemi, rubber, etc. and the various synthetic types of resins, such as the phenol-formaldehyde resins, ester gum, petroleum resins, obtained as non-distillable residues of petroleum fractions, chlorinated rubber, the alkyd resins, such as the oil-modified phthalic acid-polyol condensation products, urea-formaldehyde, maleic anhydride resins, coumarone-indene resins, polyisobutylene, the terpene hydrocarbon resins, and others compatible with the drying oil vehicle component of the varnish. The presence of the hydrocarbon drying oil component in the present vehicle greatly increases the number and variety of resins utilizable in the present printing ink composition, and extends the number of resins compatible with the drying oil vehicle because of the solubilizing action of the hydrocarbons on many resins otherwise insoluble in a vehicle consisting only of a fatty acid ester drying oil. The above cited examples of suitable resins utilizable in the composition are not exclusive of other types and the quantity incorporated into the composition may be varied within wide limits depending upon the particular resin being considered and the properties of the ultimate film desired, as well as the conditions of printing and the type of printing process utilized. The amount of resin incorporated into the vehicle is generally within the range of from 5 to about 50%, preferably from about 5 to about 30% by weight of the finished varnish.

If utilized in printing ink compositions, the resin is desirably composited with the drying oil components to provide a vehicle or varnish prior to incorporation of the other ink ingredients. For this purpose, the resin in solid form, usually in small particles, or ground to a powdered form, is added gradually, with stirring, to the cobodied drying oils. The resin may also be dissolved in a naphtha solvent, for example, or in a wax or a high molecular weight alcohol, and the resulting resin-solution added to the drying oils, where such additional components are desired in the ink composition for the purpose of providing compositions having specific properties. In order to intimately dissolve and disperse the resin throughout the drying oil, the latter is heated in a conventional varnish kettle to a temperature of from about 100° to about 300° C. and the resin stirred into the drying oil at this temperature. The resulting mixture is maintained at this temperature for a period determined by the ultimate viscosity desired, usually within the range of from about 8 to 14 poises at 25° C., although the viscosity of the unthinned varnish may be greater or less than the above-specified range, depending upon whether a naphtha solvent is incorporated into the printing ink. Thus, the varnish may be heated or bodied until a specific viscosity is obtained, and the latter decreased by addition thereto of a naphtha diluent when the varnish has cooled.

The present printing ink composition may optionally contain one or more pigments and toners, depending upon the intended use of the ink. In the production of a black printing ink, carbon black, lamp black, and vegetable blacks are the most widely used pigments for this purpose, although organic dyes, such as nigrosine black and aniline black may be utilized to advantage either separately or in conjunction with the use of carbon black. Certain organic pigments which intensify or modify the color of another pigment in the composition, referred to as toners, may also be added to the ink composition to obtain desired coloring effects. Such toners as Induline Blue and Methyl Violet are utilized especially in printing inks in which the carbon black is the primary pigment, the toner preferably being added to the composition dissolved in a fatty acid, such as oleic acid. Other pigments such as vermillion, venetian red, chrome yellow, chrome green, lithopone, titanium dioxide, etc. may also be utilized for printing inks of specific colors. The quantity of pigment added to the ink composition is generally from about 10 to about 40% by weight of the product, the higher the concentration of pigment, in general, the greater the density and opacity of the printed film.

The present printing ink composition may also contain a so-called "drier" or "siccative" component to accelerate the oxidation-polymerization reactions involved in the drying of the printed film when it is exposed to atmospheric oxidation in common with oxidative drying type printing ink compositions of the prior art. These compounds, which are usually in the form of metallic salts of carboxylic acids or in the form of metallic oxides reduce the drying time by substantially eliminating the induction period noted in the conversion of pure drying oil films to solid, resinous films, obtained when the oil is completely dried. Such driers as cobalt, lead, nickel, manganese, cerium, and iron naphthenates, oleates, linoleates, resinates, etc. and oxides, such as lead oxide in finely powdered form dispersed in the composition or dissolved in the vehicle are effective in the present printing ink composition in amounts of from about 0.1 to about 1% by weight thereof. The cobalt salts, such as cobalt naphthenate, constitute one of the preferred groups of drier salts in the present composition. The drier salt is preferably dissolved in the drying oil vehicle or ground together with the solid component of the composition prior to admixing all of the ingredients.

The following example illustrates the preparation of printing ink vehicles containing the novel copolymer of the unsaturated hydrocarbon and fatty acid ester drying oils and the incorporation of said vehicles into specific printing ink compositions, and describes the properties of the ultimate printing ink composition in relation to properties desired by commercial printers for inks of optimum printing qualities. The examples, however, are not intended to be construed as limitations of the generally broad scope of the invention herein provided.

EXAMPLE I

*Preparation of unsaturated hydrocarbon drying oil*

A hydrocarbon drying oil copolymer of butadiene and isobutylene was prepared in the following experiment using hydrogen fluoride vapor as the catalyst. 78.9 grams of butadiene and 9.8 grams of isobutylene were dissolved in 140 grams of liquid propane maintained in liquid phase by the addition of "Dry Ice" to the above hydrocarbons, and 12 grams of hydrogen fluoride vapor were gradually added to the reactants as the latter mixture was vigorously stirred. The hydrogen fluoride vapor was introduced into the reaction mixture immediately above the surface of the stirred mixture and was allowed to enter the liquid phase by absorption through the surface. Additional Dry Ice was added to the reaction mixture as the exothermic heat of the resulting copolymerization reaction vaporized the carbon dioxide, thus maintaining the reaction temperature at approximately —76° C. throughout the reaction. The mixture was stirred an additional three hours at the above temperature and the reaction then terminated by the addition of diluent sodium hydroxide to the mixture. Benzene was then introduced into the reaction mixture to form a more fluid, two-phase mixture from which the upper, benzene-containing phase was decanted from the lower aqueous phase. The benzene component was distilled from the mixture, leaving a viscous, clear liquid having an apparent bromine number of approximately 101 and an approximate molecular weight by cryoscopic means of determination of approximately 1600. The oil, when spread as a thin film on a test panel and exposed to atmospheric oxygen, dried to a tack-free film in less than 24 hours and the film had a Sward hardness of approximately 47. The recovered hydrocarbon drying oil was mixed with a fatty acid ester drying oil, the resulting mixture cobodied and the product thereafter mixed with printing ink ingredients to provide samples for the following printing ink tests.

*Preparation of printing ink vehicle*

The synthetic hydrocarbon drying oil prepared as indicated above was mixed with such unsaturated fatty acid glyceride drying oils as linseed and tung oils and the mixtures cobodied to provide printing ink vehicles having viscosities of approximately 11 poises. The vehicle for the following printing ink composition I consisted of a blend of 34.5% alkali-refined linseed oil and 65.5% unsaturated hydrocarbon drying oil, copolymerized as indicated below. The vehicle for printing ink composition II, having a viscosity of 12 poises, consisted of a cobodied mixture of 5% alkali-refined linseed oil, 29.5% tung oil and 65.5% synthetic unsaturated hydrocarbon drying oil.

The drying oil vehicle for printing ink composition I was prepared by subjecting a mixture consisting of 34.5% by weight of alkali-refined linseed oil (viscosity: 6 poises) and 65.5% by weight of the above prepared butadiene-isobutylene copolymer hydrocarbon drying oil to thermal cobodying. In this reaction, 52 grams of the alkali-refined linseed oil and 98 grams of the hydrocarbon drying oil were placed in a rotating autoclave and heated at 175° C. and at a pressure of 100 lbs./in.$^2$ (compressed nitrogen) for 35 minutes, at which time a small sample withdrawn from the autoclave indicated that the viscosity of the mixture was 12 poises. The bodied drying oil was removed from the autoclave and reserved for use in preparing the following printing ink composition I. The oil was substantially the same color as the linseed oil initially charged to the cobodying reaction.

The drying oil vehicle for printing ink composition II, tested below, was prepared by catalytically copolymerizing a mixture of 12.5 grams alkali-refined linseed oil (5% of final mixture), 74 grams (29.5% of final mixture) of tung oil and 164 grams of the above prepared unsaturated hydrocarbon drying oil (65.5% by weight) of the final mixture. The mixture of drying oils was dissolved in two volumes of n-pentane solvent, cooled to 10° C. by an external cooling bath and rapidly stirred as 10 grams of boron trifluoride etherate catalyst dissolved in five volumes of diethyl ether was added to the drying oil mixture. Stirring was continued for an additional 1.5 hours as the temperature was maintained at 10° C. throughout. The product was thereafter washed twice, in each case with three volumes of water and heated to 30° C. to distill the ether and n-pentane solvents from the mixture. The distillation residue was a light-colored oil having a viscosity of 12 poises.

A printing ink vehicle consisting of No. 0 bodied linseed oil (viscosity, 11 poises) was prepared as a standard for comparison with the ink vehicles provided by the present invention. The standard vehicle is considered as representative of presently known oxidative-type printing ink vehicles now utilized in conventional printing ink compositions of the art.

Printing ink compositions were prepared from the drying oil vehicles described above and the properties determined and compared with the standard ink compositions prepared from the standard vehicle consisting of bodied linseed oil. The respective printing inks were then utilized in a printing operation, employing a conventional printing press (Vandercook Proving Press) in which the printing plate (a rotating impression cylinder) containing both solid and half-tone areas was uniformly inked over its entire surface with each of the inks subjected to the test. The inks were printed upon several representative types of paper, including; (1) an English finish paper (or machine finish paper) made from sulfite pulp, the surface of which was filled with a white pigment, (2) a super-calendered paper (same as English paper finished by friction calender rolls to provide a substantially non-absorbent paper), and (3) a coated paper containing a coating of clay and casein, calendered to a smooth, high finish. Each ink was evaluated on the basis of the properties described below and compared with a formulation containing the standard vehicle:

*Flow.*—10 grams of the ink was scraped into a mound about ½ inch high on a glass plate and the time required for the material to level into a pool was determined, a leveling time of 1 minute indicating good flow.

*Tack.*—A qualitative test was made by rubbing a small quantity of the ink into a very thin film, using the middle finger to measure the pull resistance as compared to the standard ink composition.

*Drying qualities.*—A section of a solid printed area was rubbed with the middle finger, using considerable pressure and noting the amount of ink smeared onto the white area next to the printed area.

*Printing quality.*—The ability of the ink to print a dense, black, solid film without filling in the half-tone areas on the printed paper was noted, an inferior ink completely filling in the half-tone areas to a solid film.

*Scratch resistance.*—The back of the finger nail is slid across the half-tone areas of the sheet, the darker the line appearing on the sheet, the poorer the rating of the ink as to scratch resistance.

*Rub resistance.*—A 2-inch wide strip of paper under a 100 gram weight was pulled across the solid area of the print and the degree of burnishing on the printed film was noted, as well as the quantity of ink transferred to the paper strip.

*Penetration.*—The degree of darkness appearing on the backside of the printed paper was noted, especially for the absorbent type of printing paper, such as an English finish paper.

Printing ink compositions

Printing ink formulations utilized as samples in the following evaluations were prepared for comparative tests, utilizing the standard testing procedures hereinabove described. Each sample of printing ink was prepared by a uniform procedure for each of the vehicles subjected to the test. This procedure was as follows:

Each of the drying oil vehicles was reduced to a standard 11 poise viscosity, where necessary, by the addition of a petroleum naphtha solvent (Apco deodorized solvent #467) and the resulting vehicle mixed with carbon black (Peerless Brand Channel Black) by grinding 70 grams of the vehicle with 20 grams of the carbon black on a 3-roller mill. The resulting dispersion of vehicle and carbon black was then ground on the 3-roller mill with 5 grams of Methyl-Violet toner ink, 5 grams of Iron Blue ink and 8 grams of Cobalt ink drier (Cobalt Naphthenate, 6% Co).

The following Table I is a tabulation of the printing results of the various testing procedures to which the printing ink compositions were subjected:

TABLE I

*Physical test comparison of ink compositions containing drying oil vehicles comprising copolymers of unsaturated hydrocarbon and fatty acid glyceride drying oils and a standard containing linseed oil*

| Printing Ink Composition No. | Rating [1] | | | | | | |
|---|---|---|---|---|---|---|---|
| | Flow | Tack | Printing | Drying | Scratch Resist | Rub Resist | Penetration |
| I | + | 0 | + | ++ | ++ | ++ | ([2]) − |
| II | + | + | + | ++ | ++ | ++ | ([2]) − |
| III (St'd) | 0 | 0 | 0 | 0 | 0 | 0 | 0 |

[1] Code:
++ Much better than standard.
+ Better than standard.
0 Equal to standard.
− Slightly worse than standard.
[2] Tested on English finish paper; 0 to + on calendered and coated paper.

We claim as our invention:

1. A printing ink composition comprising a pigment and, as a vehicle for the pigment, the copolymerized product of an unsaturated fatty acid ester drying oil and an unsaturated hydrocarbon drying oil consisting essentially of polyolefinic, high molecular weight hydrocarbons formed by the hydrogen fluoride catalyzed copolymerization, at a temperature of from about −80° C. to about 0° C., of a mixture of from about 40 to about 5% by weight of an aliphatic isomono-olefin of not more than 8 carbon atoms and from about 60 to about 95% by weight of an aliphatic conjugated diolefin of not more than about 8 carbon atoms.

2. A printing ink composition comprising a pigment and a varnish vehicle consisting of the copolymerized product of from about 10 to about 75 parts by weight of an unsaturated fatty acid ester drying oil and from about 90 to about 25 parts by weight of an aliphatic polyolefinic hydrocarbon drying oil having a molecular weight of from about 500 to about 5000 and containing from about 10 to about 80 double bonds per molecule.

3. The composition of claim 2 further characterized in that said fatty acid drying oil is tung oil.

4. The composition of claim 2 further characterized in that said fatty acid ester drying oil is linseed oil.

5. The composition of claim 2 further characterized in that said hydrocarbon drying oil is formed by the hydrogen fluoride catalyzed copolymerization, at a temperature of from about −80° to about 0° C. of a mixture of from about 60 to about 95% by weight of an aliphatic conjugated diolefin of not more than 8 carbon atoms and from about 40 to about 5% by weight of an aliphatic isomono-olefin of not more than 8 carbon atoms.

6. The composition of claim 5 further characterized in that said diolefin and said isomono-olefin are, respectively, butadiene-1,3 and isobutylene.

7. As a varnish vehicle suitable for printing ink compositions, the copolymerized product of an unsaturated fatty acid ester drying oil and an unsaturated hydrocarbon drying oil consisting essentially of polyolefinic high molecular weight hydrocarbons formed by the hydrogen fluoride-catalyzed copolymerization, at a temperature of from about −80° C. to about 0° C., of a mixture of from about 40 to about 5% by weight of an aliphatic isomono-olefin of not more than 8 carbon atoms and from about 60 to about 95% by weight of an aliphatic conjugated diolefin of not more than about 8 carbon atoms.

8. The composition of claim 7 further characterized in that said product is formed by copolymerization of said hydrocarbon drying oil and said unsaturated fatty acid ester drying oil in the presence of an acid-acting catalyst at a temperature of from about −20° to about 100° C.

9. The composition of claim 7 further characterized in that said product is formed by thermally copolymerizing said hydrocarbon drying oil and said unsaturated fatty acid ester drying oil for a reaction period sufficient to yield a copolymer having a viscosity of from 8 to about 14 poises.

10. As a varnish vehicle suitable for printing ink compositions, the copolymerization product of an unsaturated fatty acid ester drying oil and an aliphatic polyolefinic hydrocarbon drying oil having a molecular weight of from about 500 to about 5000 and containing from about 10 to about 80 double bonds per molecule.

11. The copolymerization product of claim 10 further characterized in that said hydrocarbon drying oil is the copolymer of an aliphatic isomono-olefin of not more than about 8 carbon atoms and an aliphatic conjugated diolefin of not more than about 8 carbon atoms.

12. A printing ink composition comprising a pigment suspended in the copolymerization product of claim 10.

References Cited in the file of this patent

UNITED STATES PATENTS

| | | |
|---|---|---|
| 2,135,976 | Koenig | Nov. 8, 1938 |
| 2,421,422 | Johnson | June 3, 1947 |
| 2,424,143 | Brown | July 15, 1947 |
| 2,578,214 | West | Dec. 11, 1951 |
| 2,581,413 | Hillyer | Jan. 8, 1952 |
| 2,640,782 | Block et al. | June 2, 1953 |